(12) United States Patent
Chen et al.

(10) Patent No.: US 10,260,475 B2
(45) Date of Patent: Apr. 16, 2019

(54) INTERNAL COMBUSTION ENGINE AND GARDEN TOOL

(71) Applicant: SUZHOU CLEVA PRECISION MACHINERY & TECHNOLOGY CO., LTD., Suzhou, Jiangsu Province (CN)

(72) Inventors: Hong Chen, Suzhou (CN); Zhao Kong, Suzhou (CN)

(73) Assignee: Suzhou Cleva Precision Machinery & Technology Co., Ltd., Suzhou (CN)

(*) Notice: Subject to any disclaimer, the term of this patent is extended or adjusted under 35 U.S.C. 154(b) by 0 days.

(21) Appl. No.: 15/593,614

(22) Filed: May 12, 2017

(65) Prior Publication Data

US 2018/0320651 A1 Nov. 8, 2018

(30) Foreign Application Priority Data

May 2, 2017 (CN) .......................... 2017 1 0301064

(51) Int. Cl.

| | |
|---|---|
| *F02N 11/08* | (2006.01) |
| *F02N 15/02* | (2006.01) |
| *F02P 3/06* | (2006.01) |
| *F02M 35/10* | (2006.01) |
| *F02B 63/02* | (2006.01) |
| *F02P 5/04* | (2006.01) |
| *F02D 11/02* | (2006.01) |
| *F02B 75/16* | (2006.01) |

(52) U.S. Cl.
CPC .......... *F02N 11/0862* (2013.01); *F02B 63/02* (2013.01); *F02B 75/16* (2013.01); *F02D 11/02* (2013.01); *F02N 15/022* (2013.01); *F02P 3/06* (2013.01); *F02P 5/045* (2013.01); *F02M 35/1017* (2013.01)

(58) Field of Classification Search
CPC ............................. F02N 11/0862; F02B 63/02
USPC ....................................................... 123/179.3
See application file for complete search history.

(56) References Cited

U.S. PATENT DOCUMENTS

| | | | | |
|---|---|---|---|---|
| 3,247,727 | A * | 4/1966 | Digby | ..................... F02N 15/02 |
| | | | | 192/45.018 |
| 5,351,565 | A | 10/1994 | Wada et al. | |
| 5,818,115 | A * | 10/1998 | Nagao | ..................... F02N 11/04 |
| | | | | 290/31 |
| 6,325,035 | B1 * | 12/2001 | Codina | ............... F02N 11/0866 |
| | | | | 123/179.1 |
| 6,640,444 | B1 * | 11/2003 | Harada | ................... F02B 63/02 |
| | | | | 173/221 |

(Continued)

FOREIGN PATENT DOCUMENTS

EP      0364118      4/1990

*Primary Examiner* — Hieu T Vo
*Assistant Examiner* — Arnold Castro
(74) *Attorney, Agent, or Firm* — JK Intellectual Property Law, PA (57) ABSTRACT

An internal combustion engine includes an engine block including a cylinder, a piston positioned within the cylinder, a crankshaft configured to be driven by the piston, a fuel supply system for supplying an air-fuel mixture to the cylinder, an ignition system, an electric starting system including a starter motor, and an ultracapacitor mounted on the engine, the ultracapacitor configured to power the starter motor to start the engine. A related garden tool is also disclosed.

9 Claims, 7 Drawing Sheets

(56) References Cited

U.S. PATENT DOCUMENTS

| | | | | |
|---|---|---|---|---|
| 7,690,343 | B2* | 4/2010 | Doljack | F02N 11/0866 |
| | | | | 123/179.25 |
| 7,704,110 | B2* | 4/2010 | Wiatrowski | F02N 11/0862 |
| | | | | 440/85 |
| 7,806,095 | B2* | 10/2010 | Cook | F02N 11/0866 |
| | | | | 123/179.3 |
| 8,324,754 | B2* | 12/2012 | Broesse | B60R 16/03 |
| | | | | 307/10.1 |
| 8,857,138 | B2* | 10/2014 | Hansen | F02N 11/0803 |
| | | | | 56/10.8 |
| 9,228,556 | B2 | 1/2016 | Koenen et al. | |
| 9,725,055 | B2* | 8/2017 | Gonzalez, Jr. | B60R 16/033 |
| 9,774,202 | B2 | 9/2017 | Zhou | |
| 9,819,064 | B2* | 11/2017 | Jiang | H01M 16/00 |
| 9,890,755 | B2* | 2/2018 | Koenen | F02N 11/12 |
| 2002/0024322 | A1* | 2/2002 | Burke | F02N 11/0866 |
| | | | | 320/166 |
| 2004/0012204 | A1* | 1/2004 | Walter | F02N 11/06 |
| | | | | 290/36 R |
| 2009/0050092 | A1* | 2/2009 | Handa | F02N 11/0866 |
| | | | | 123/179.3 |
| 2009/0255502 | A1* | 10/2009 | Cook | A01D 34/6818 |
| | | | | 123/185.3 |
| 2013/0111864 | A1* | 5/2013 | Hansen | B60T 7/042 |
| | | | | 56/10.8 |
| 2013/0152733 | A1* | 6/2013 | Ke | F02N 11/00 |
| | | | | 74/7 C |
| 2014/0299089 | A1* | 10/2014 | Koenen | F04B 17/05 |
| | | | | 123/179.28 |

* cited by examiner

INTERNAL COMBUSTION ENGINE AND GARDEN TOOL

CROSS REFERENCE TO RELATED APPLICATIONS

This application claims priority to Chinese Patent Application No. CN201710301064.9 filed on May 2, 2017, which is hereby incorporated by reference in its entirety.

TECHNICAL FIELD

The disclosure relates to an internal combustion engine having an electric starting system. The disclosure also relates to a garden tool with the internal combustion engine as the power source.

BACKGROUND

The present disclosure generally relates to small type internal combustion engines including electric starting systems and garden tool powered by such engines.

Garden tool includes riding or pushing lawnmower, hand-held or back-mounted trimmer, pruner, bush cutter, blower and chainsaw etc. Garden tool may, for example use an internal combustion engine to drive an implement, such as a rotary blade of a lawnmower, a trimming string of a trimmer, an air-generating device of a blower, and/or a saw chain of a chainsaw.

Many pieces of garden tool include engines that are manually started with a recoil starter. To start the engine, the user must manually pull a recoil starter rope.

Other pieces of garden tool include electric starting systems in which a starter motor powered by a battery pack starts the engine. Typically, such electric starting systems also include a user-actuated starter switch (e.g., a key switch or a push button). To start the engine, the user actuates the starter switch, causing the battery pack to provide starting current to the starting motor to start the engine. For example, an engine including an electric starting system in which a starter motor powered by a rechargeable battery pack and a hand-held bush cutter including the engine was disclosed in U.S. Pat. No. 5,351,565. The battery pack mounted on the engine directly in some embodiments, and disposed on a shoulder band or on a connection pipe in others embodiments, was further disclosed in U.S. Pat. No. 5,351,565. For another example, an internal combustion engine using in a pushing lawnmower comprising a starting system in which a starter motor powered by a rechargeable lithium-ion battery mounted on the engine was disclosed in U.S. Pat. No. 9,228,556 B1.

Other pieces of garden tool include engines comprising a recoil starter and an electric starting system. To start the engine, the user can select to operate the recoil starter or the electric starting system. For example, a starting apparatus for a 4-cycle gasoline engine comprising a starter motor powered by a rechargeable battery which detachably mounted on the engine and a recoil starter was disclosed in Patent EP0364118 61.

However, the above existing technique has the following problems. The rechargeable batteries including lead-acid batteries, nickel-metal hydride batteries, nickel-cadmium batteries and lithium-ion batteries, etc., used in the starting systems, are unable to meet demand of garden tools operating continuously for a long period due to several hours of charging. It requires users to regularly maintain the rechargeable batteries which fading on account of improper use or repeated charge and discharge. Especially for the most used lithium-ion batteries, it will significantly accelerate capacity fade by quick charge and discharge, long-term deep charge and discharge, high temperature environment and so on.

SUMMARY

On one embodiment of the invention relates to an internal combustion engine including: an engine block including a cylinder, a piston positioned within the cylinder, a crankshaft configured to be driven by the piston, a fuel supply system for supplying an air-fuel mixture to the cylinder, an ignition system, an electric starting system including a starter motor, and an ultracapacitor mounted on the engine, the ultracapacitor configured to power the starter motor to start the engine.

Another embodiment of the invention relates to the internal combustion engine further including: a control system including at least one sensor and a control unit, at least one sensor collecting the operating condition signals of the engine, the control unit controlling the ignition system and/or the fuel supply system according to the received operating condition signals.

Another embodiment of the invention relates to the internal combustion engine further including: an operation unit issuing user command signals when the user physical trigger, the control unit controlling at least one action of start, stop and fuel supply adjustment of the engine according to the received user command signals.

Another embodiment of the invention relates to the internal combustion engine wherein the electric starting system further including a reduction mechanism; when starting, the starter motor driving the crankshaft via the reduction mechanism; a clutch mechanism, which is a sprag clutch, provided between the reduction mechanism and the crankshaft.

Another embodiment of the invention relates to the internal combustion engine wherein the reduction mechanism further including an energy storage storing the kinetic energy and releasing the energy to the crankshaft.

Another embodiment of the invention relates to the internal combustion engine wherein a receiver provided on the engine, and the ultracapacitor module removably attached to the receiver.

Another embodiment of the invention relates to the internal combustion engine wherein the piston reciprocating in the cylinder along a first axis; wherein the ultracapacitor module including at least one single ultracapacitor having a second axis extending the longitudinal direction thereof, and the first axis configured to be not parallel to the second axis.

On one embodiment of the invention relates to a garden tool including: a torque unit including a small type internal combustion engine, and a working unit driven by the torque unit; the engine including: an engine block including a cylinder, a piston positioned within the cylinder, a crankshaft configured to be driven by the piston, a fuel supply system for supplying an air-fuel mixture to the cylinder, an ignition system, an electric starting system including a starter motor, and an ultracapacitor mounted on the engine, the ultracapacitor configured to power the starter motor to start the engine.

Another embodiment of the invention relates to the garden tool The garden tool, further including: an operation unit, provided on a handle unit, issuing user command signals when the user physical trigger, a control unit, provided in the engine, controlling at least one action of start, stop and fuel supply adjustment of the engine according to the received user command signals.

Another embodiment of the invention relates to the garden tool wherein the operation unit configured to be a panel; at least two keys provided on the panel; a protrusion portion provided between the two adjacent keys.

BRIEF DESCRIPTION OF THE DRAWINGS

The disclosure will become more fully understood from the following detailed description when taken in conjunction with the accompanying figures.

DETAILED DESCRIPTION OF THE PREFERRED EMBODIMENTS

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Embodiment One

Referring FIG. 1~FIG. 12, a garden tool 1 is illustrated according to an exemplary embodiment. The garden tool 1 includes a torque unit 11, a connection pipe 12, a working unit 13 and a handle unit 14. The garden tool 1 is a hand-held trimmer in this embodiment. The garden tool 1 certainly could be other hand-held garden tool (e.g., chainsaw, blower, brush cutter) or pushing garden tool (e.g., lawn mower) or back-mounted garden tool (e.g., trimmer, chainsaw, blower, bush cutter) in others embodiments. It defines that front end is the end away from the user along the longitudinal direction of the trimmer when held to trim for description. Therein the torque unit 11 comprises a housing 111 which extending forward to form a handle unit 14. The connection pipe 12, in which provided a torque transmission mechanism (not shown) to transmit the output of the torque unit 11 to the working unit 13, is connected to the handle unit 14 at the rear end and to the working unit 13 at the front end. In this embodiment, a small type internal combustion engine 2 provided in the housing 111 includes an engine block 201, a fuel tank 2011, a cylinder 2022, a piston 203 provided within the cylinder 2022, a crankshaft 204 driven by the piston 203 and provided in a cranktank 2014 and a flywheel 243 driven by the crankshaft 204. The structure of such a small type internal combustion engine is known in the art and will not be elaborated herein. When the trimmer being operated, the continuous rotation of the crankshaft 203, converted from the reciprocating motion of the piston 203 in the cylinder 2022, is transmitted to the working unit 13, and the working unit 13 including trimming string or blade rotates to trim.

Figure 1:
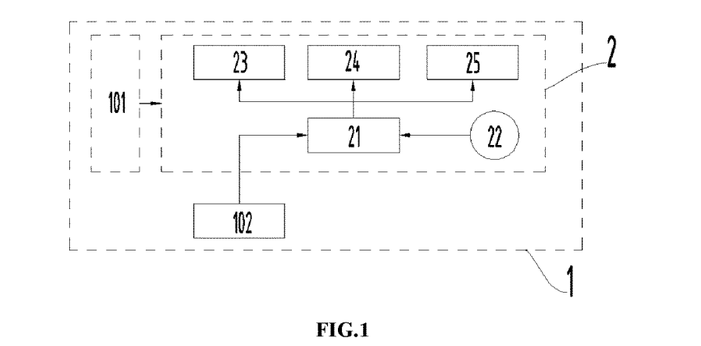
FIG. 1 is a schematic diagram of a control structure of a garden tool, according to an embodiment of the invention.
Figure 2:
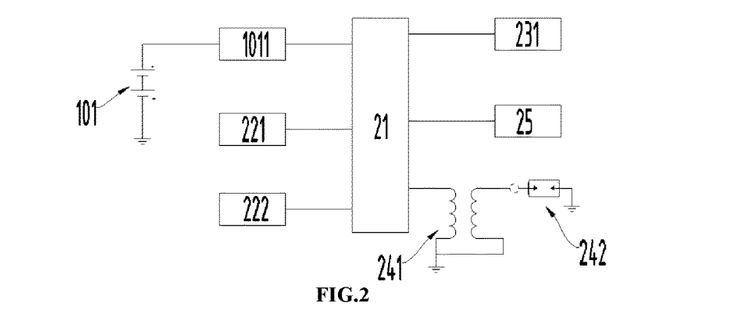
FIG. 2 is a schematic diagram of a specific control structure of a garden tool, according to an exemplary embodiment of the invention.

Referring to FIG. 1, in this embodiment, the trimmer further includes a control system comprising a control unit 21, at least one sensor 22 and an operation unit 102. The internal combustion engine 2 further includes, on the engine block 201, a starting system 23, an ignition system 24 and a fuel supply system 25. Therein the sensor 22 collects the operating condition signals of the trimmer, especially of the internal combustion engine 2. And the operation unit 102 issues user command signals when the user physical trigger. The control unit 21 controls the ignition system 24 and/or the fuel supply system 25 according to the received operating condition signals, and also controls at least one action of start, stop and fuel supply adjustment of the trimmer according to the received user command signals. In this embodiment, the control unit 21 is provided in the housing 111, especially in the internal combustion engine 2. In others embodiment, the control unit 21 is provided in other part of the trimmer. The operation unit 102 is provided apart from the control unit 21 in this embodiment. Referring to FIG. 3~FIG. 6, specifically, the control unit 21 is provided in the housing 111. The operation unit 102 is provided at the front end of the handle unit 14. Preferably, the operation unit is provided in the front of the gripping portion 141 of the handle unit 14. A communication cable 2012 connects the control unit 21 with the operation unit 102. In others embodiment, wireless signal transceivers are provided respectively in the control unit 21 and the operation unit 102 that the two units are connected via wireless signals. And in others embodiment, the operation unit 102 is provided apart from the trimmer, i.e. the operation unit 102 may be provided on a separate remote controller communicating with the control unit 21 via cable or radio. And in further embodiments, the operation unit 102 may be an independent intelligent terminal, issuing user command signals by software programs since user physical trigger and transmitting the signals via cable or radio, such as a desktop computer or a mobile terminal (e.g., mobile phone, laptop or tablet).

In this embodiment, the trimmer further includes a detachable ultracapacitor module 101 to power the entire trimmer through the control unit 21. It should be noted that ultracapacitor is also known as supercapacitor, electric double-layer capacitor or pseudocapacitor. The ultracapacitor module 101 is removably attached to a receiver 1111 provided on the internal combustion engine 2, and electrically connected to the control unit 21. Preferably, the ultracapacitor module 101 is configured to be selectively attached or removed to the receiver without tools. A power supplier module connected between the ultracapacitor module 101 and the control unit 21 is configured to adjust the discharge voltage and/or current of the ultracapacitor module 101. Further, the piston 203 reciprocates in the cylinder 202 along a first axis. The ultracapacitor module 101 includes at least one single ultracapacitor having a second axis extending the longitudinal direction thereof. In this embodiment, the first axis is not parallel to the second axis.

Figure 3:
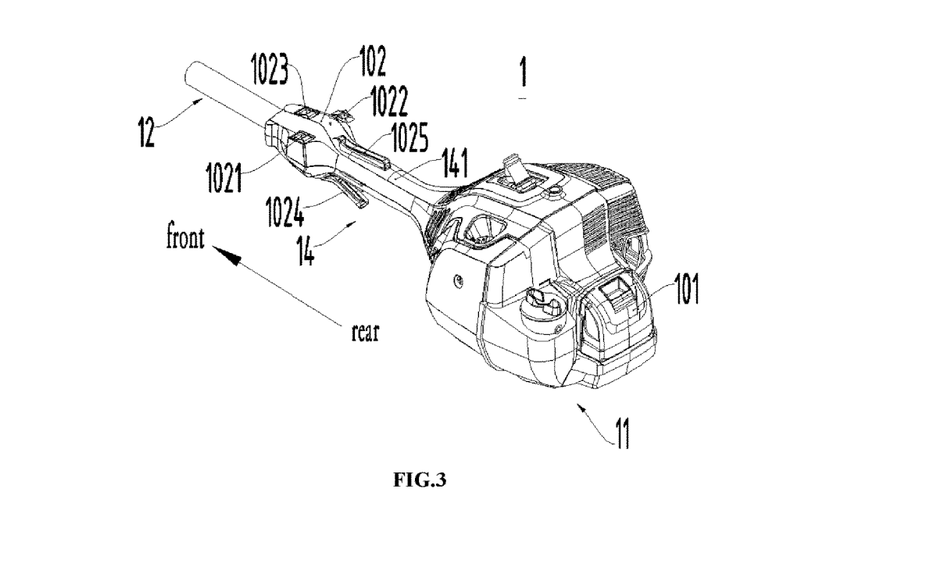
FIG. 3 is a perspective view of a garden tool, according to an exemplary embodiment of the invention.
Figure 4:
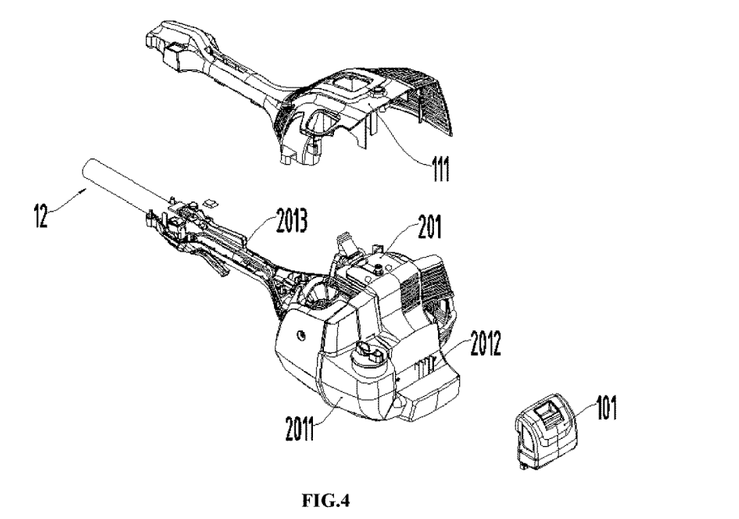
FIG. 4 is an exploded view of the garden tool of FIG. 3.
Figure 5:
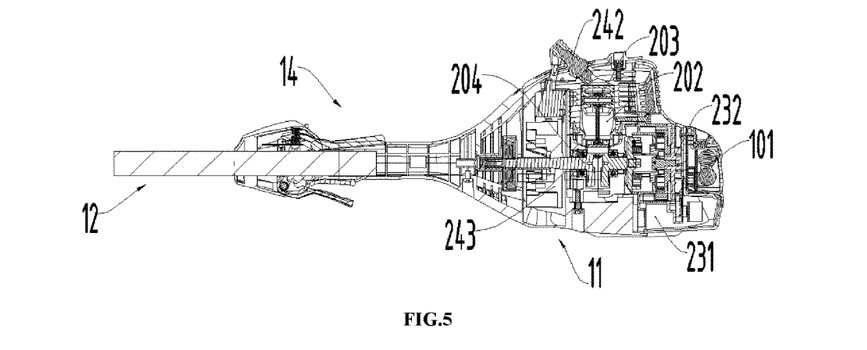
FIG. 5 is a longitudinal cross-section view of the garden tool of FIG. 3.
Figure 6:
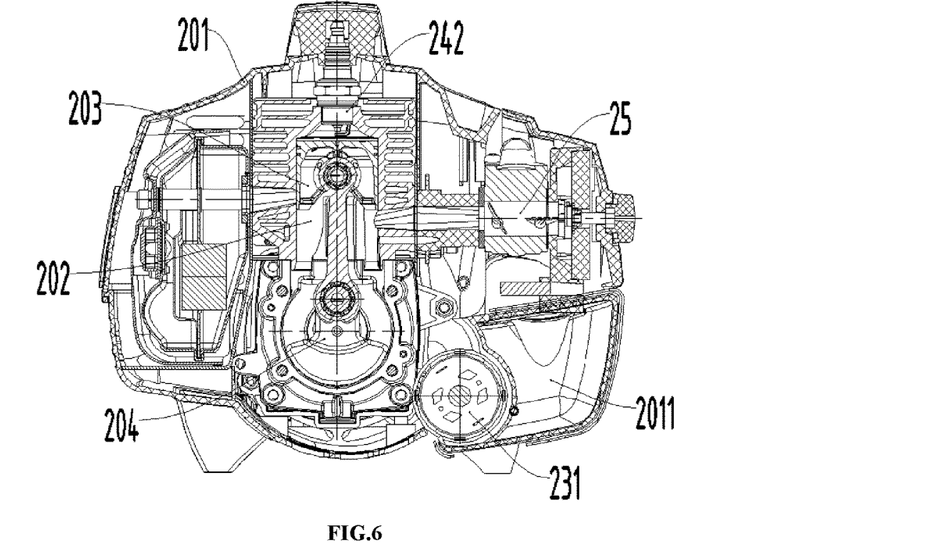
FIG. 6 is a horizontal cross-section view of an internal combustion engine of the garden tool of FIG. 3.
Figure 7:
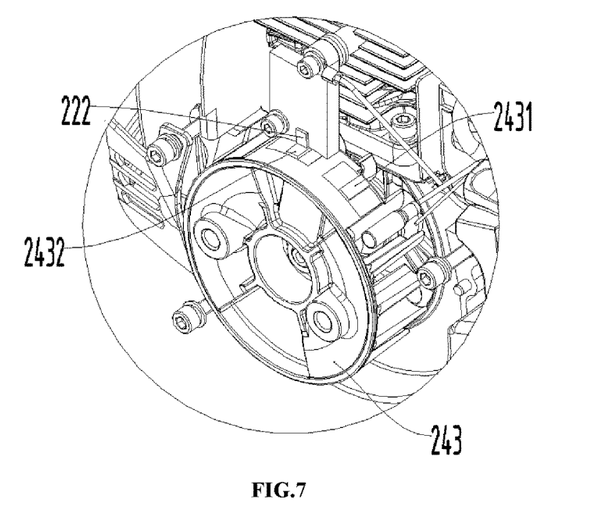
FIG. 7 is a detail view of the engine in FIG. 6.
Figure 8:
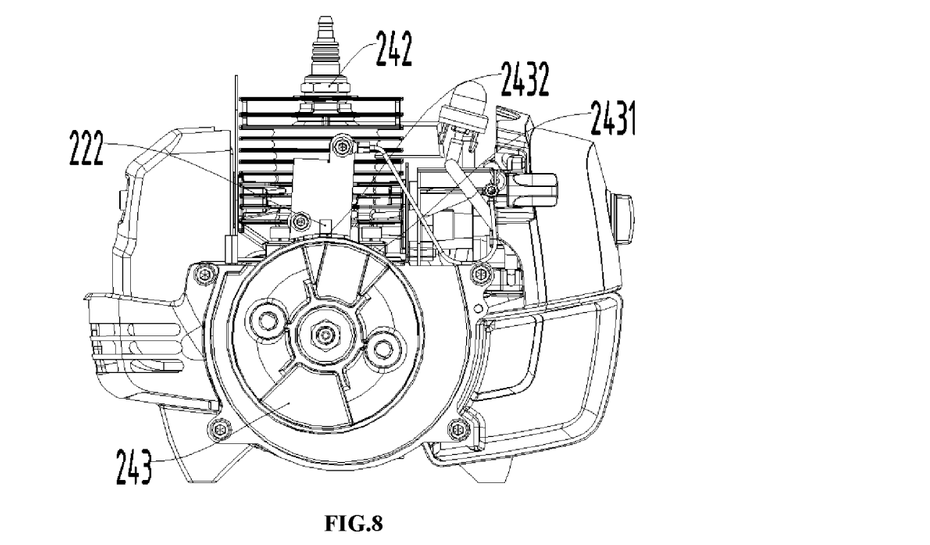
FIG. 8 is a side view of a face on which a flywheel is provided of the internal combustion engine in FIG. 6.
Figure 9:
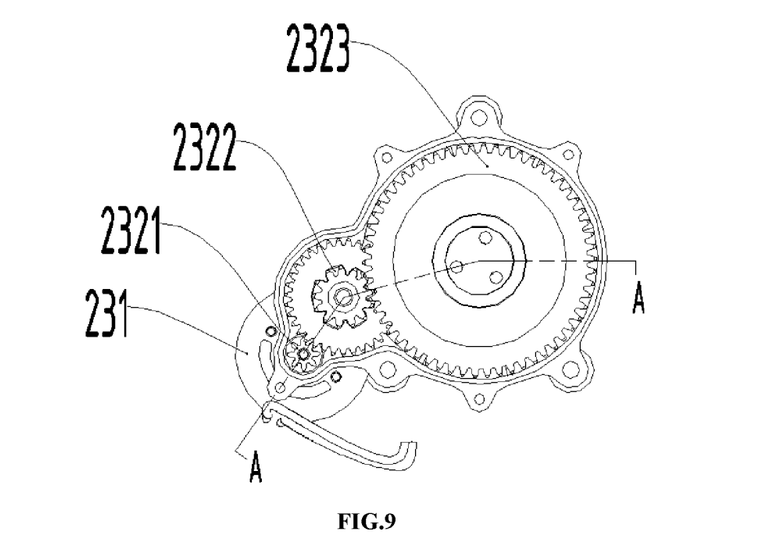
FIG. 9 is a side view of a reduction mechanism of the internal combustion engine in FIG. 6.
Figure 10:
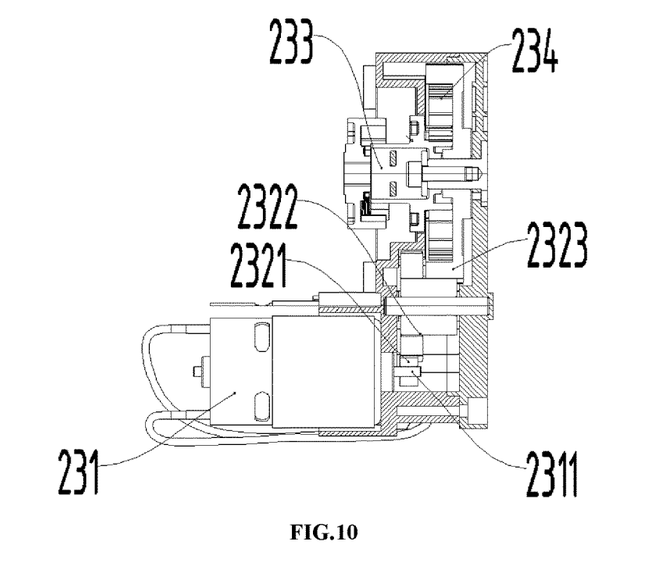
FIG. 10 is a cross-section view of the reduction mechanism in FIG. 9, according to line A-A.
Figure 11:
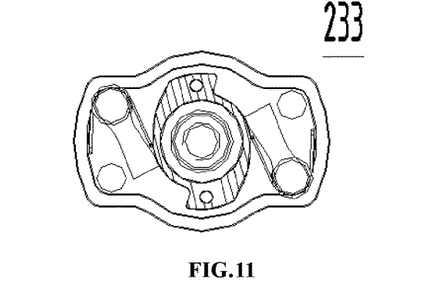
FIG. 11 is a side view of a sprag clutch of the internal combustion engine in FIG. 6.

Referring to FIG. 3, the operation unit 102 includes a first key 1021, a second key 1022, a third key 1023, a [forth] fourth key 1024 and a fifth key 1025. Therein the first key 1021, the second key 1022 and the third key 1023 are rocker switches provided on the upper surface of the front portion of the operation unit 102. The fourth key 1024 is provided a handle-type switch on the bottom surface of the rear portion of the operation unit 102. The fifth key 1025 is provided as well a handle-type switch on upper surface of the operation unit 102 and opposed to the fourth key 1024. Specifically, the first key 1021 is a master switch. The second key 1022 is a starter switch. The third key 1023 is a stop switch. The fourth key 1024 is a fuel supply adjustment switch. The fifth key 1025 is a fuel supply lock switch. To start the trimmer, the master switch is triggered firstly to connect the circuit of the trimmer; and then the starter switch is triggered to start the internal combustion engine 2 controlled by the control unit 21. To operate the trimmer, the control unit 21 controls the fuel supply system 25 to adjust the fuel supply according to the different pressure on the fuel supply adjustment switch from the users; when the amount of fuel supply is constant for a long time, the fuel supply adjustment switch can be released as the fuel supply lock switch is triggered and the control unit 21 locks the amount of fuel supply according to the condition of the fuel supply lock switch. To stop the trimmer, the stop switch is triggered firstly to stop the engine 2 controlled by the control unit 21, and then the master switch is triggered to cut off the circuit of the trimmer Referring to FIG. 5~FIG. 12, the starter system 23 includes a starter motor 231 and a reduction mechanism 232. Therein the starter motor 231 is positioned beneath the cylinder 2022 to keep away from the high temperature area. The starter motor 231 includes an output shaft 2311 which extends afterwards along the longitudinal direction of the trimmer. The reduction mechanism is connected with the output shaft 2311 by the input gear 2321 and connected with the rear end of the crankshaft 204 by the output gear via a clutch mechanism 233. Referring to FIG. 9 and FIG. 10, the reduction mechanism 232 is multi-stage gear and includes at least a transmission gear 2322 coupled to the input gear 2321 and the output gear 2323. Referring to FIG. 11, the clutch mechanism 233 is a sprag clutch.

Figure 12:
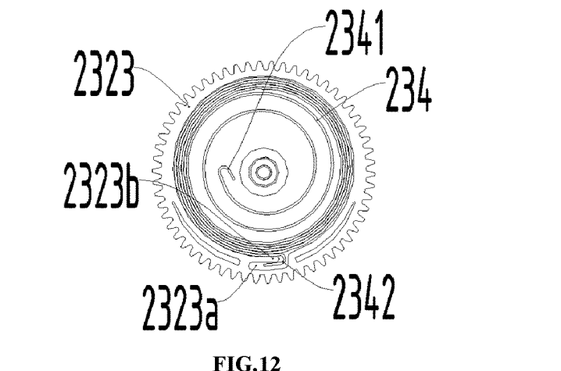
FIG. 12 is a side view of an energy storage of the internal combustion engine in FIG. 6.

Referring to FIG. 12, the energy storage is preferably provided inside the output gear 2323 and is preferably a coil spring 234 whose center coaxial with the center of the output gear 2323. The coil spring 234 can reduce the impact among the components when starting so as to prolong the life of the starting system 23. The coil spring 234 includes an inner end 2341 and an outer end 2342. The multi-layer winding between the inner end 2341 and the outer end 2342 causes the energy storage and release, wherein the space of the multi-layer is contractible and enlarged. Correspondingly, a groove 2323a is provided near the outer edge of the output gear 2323 to accept the outer end 2342; and a hook 2323b is provided on one side of the groove 2323a to hook the outer end 2342.

When starting, the input gear 2321, which driven by the high speed rotating output shaft 2311 of the starter motor, couples to and drives the output gear 2323. Tension force is continuously applied to the coil spring 234 as the output gear 2323 rotating, i.e., the kinetic energy is stored in the coil spring 234. Once the resilience of the coil spring 234 becomes greater than the resistance of the crankshaft 204, the energy would be transferred from the coil spring 234 to the crankshaft 204 via the clutch mechanism 233 to start the engine 2. The clutch mechanism 233 makes the reduction mechanism 232 to stop once the engine 2 started and the crankshaft 204 rotating rapidly.

In this embodiment, the ultracapacitor module 101 is provided behind the reduction mechanism 232 while the cranktank 2014 is provided in front of the reduction mechanism 232. The starter motor 231 and the crankshaft 204 are both connected with the front of the reduction mechanism 232. With these arrangements, the torque unit 11 can be compact, handsome and easy for wire layout.

Referring to FIG. 2, FIG. 5, and FIG. 7~FIG. 8, the ignition system 24 includes a booster 241, a spark plug 242 connected to the booster 241, a second sensor 222 provided on the flywheel 243 or the engine block 201. In this embodiment, the second sensor 222 includes at least two sensing elements and one Hall element correspondence with the sensing elements, wherein the sensing elements are magnets provided on the flywheel 243 and the Hall element is provided on the engine block 201. In others embodiments, the Hall element may also be replaced by a photovoltaic element or other element. The spark plug 242 mounted on the cylinder 202 and at least partially extends into the combustion chamber provided in the cylinder 202. Preferably, the sensing elements, provided on the circumferential of the flywheel 243, include a locating magnet 2432 for initial positioning and a measuring magnet 2431 for rotation rate measurement. In this embodiment, the engine 2 further includes a third sensor which is a temperature sensor for collecting the temperature signals of environment.

In the present invention, the ignition advance angle is determined by the rotation rate of the flywheel 243 detected by the second sensor 222, and the current temperature is determined by the third sensor. The output voltage of the ultracapacitor 101 is boosted from low voltage to high voltage by the booster 241 which controlled by the control unit 21. The control unit 21 calculates the ignition advance angle and the ignition energy according to the current working condition such as the rotation rate, the working time, the temperature and so on. And then the spark plug 242 of the ignition system 24 sparks to burn the oil and air mixture in the cylinder 202, so that the piston 203 is driven to reciprocate.

Embodiment Two

Figure 13:
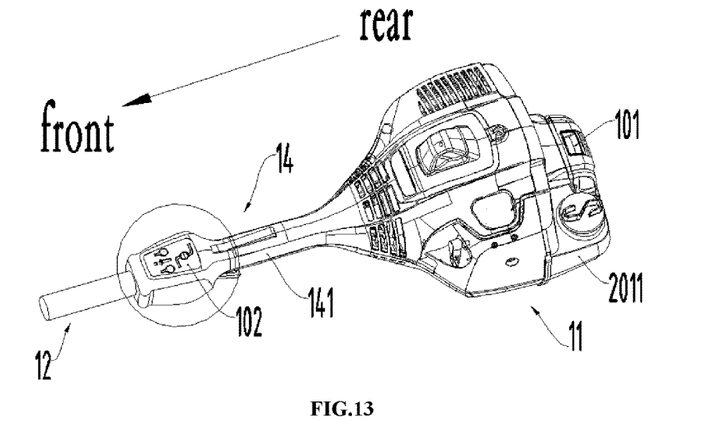
FIG. 13 is a perspective view of a garden tool, according to an exemplary embodiment of the invention.
Figure 14:
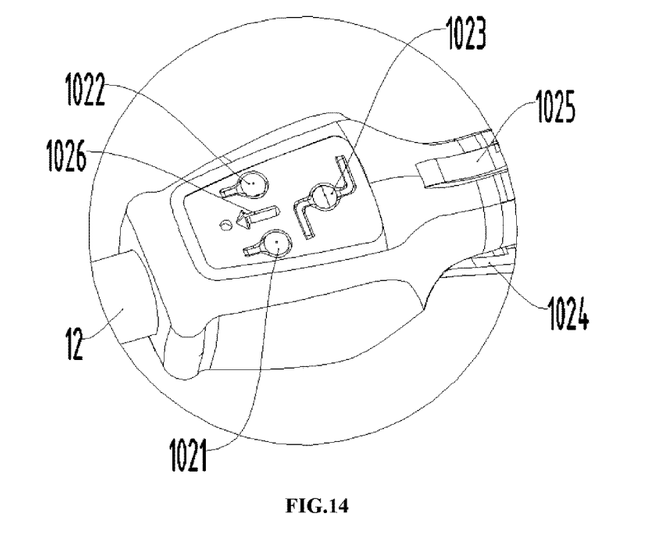
FIG. 14 is a detail view of the garden tool in FIG. 13.

Referring to FIG. 13 and FIG. 14, the different from the trimmer within an internal combustion engine provided in this embodiment and the trimmer in EMBODIMENT ONE is that the operation unit 102 includes a panel on which the first key 1021, the second key 1022 and the third key 1023 disposed and all of the keys are flat button switch. A protrusion portion 1026 is provided between the first key 1021 and the second key 1022 to prevent simultaneous triggering.

Embodiment Three

Figure 15:
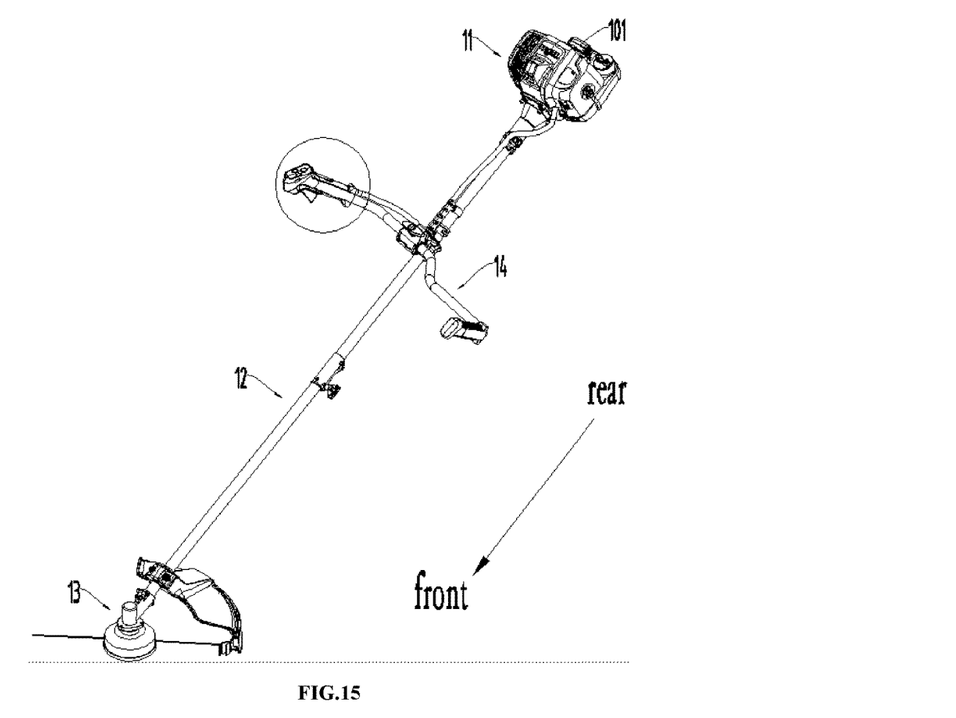
FIG. 15 is a perspective view of a garden tool, according to an exemplary embodiment of the invention.
Figure 16:
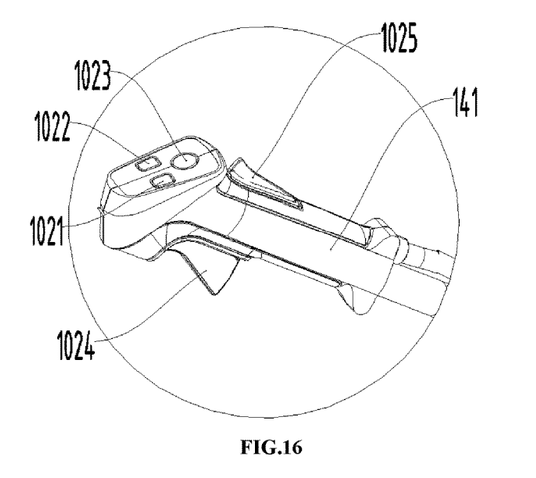
FIG. 16 is a perspective view of the garden tool in FIG. 15.

Referring to FIG. 15 and FIG. 16, the different from the EMBODIMENT TWO is that the handle unit 14 is a U-shaped handle set on the connection pipe 12, and the operation unit 102 is provided on any one of two gripping portion 141 disposed at both ends of the U-shaped handle.

The construction and arrangements of the internal combustion engine and garden tool, as shown in the various exemplary embodiments, are illustrative only. Although only a few embodiments have been described in detail in this disclosure, many modifications are possible (e.g. variations in sizes, dimensions, structures, shapes and proportions of the various elements, values of parameters, mounting arrangements, use of materials, colours, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing form the scope of the present invention.

We claim:

1. An internal combustion engine comprising:
    an engine block including a cylinder;
    a piston positioned within the cylinder, the piston reciprocating in the cylinder along a first axis;
    a crankshaft configured to be driven by the piston;
    a fuel supply system for supplying an air-fuel mixture to the cylinder;
    an ignition system;
    an electric starting system including a starter motor having an output shaft, an input gear being mounted for rotation with the output shaft;
    a clutch mechanism mounted to the crankshaft;
    a reduction mechanism driven by the input gear, the reduction mechanism having a transmission gear, an output gear, and a coil spring, the transmission gear having a first toothed ring driven by the input gear and a second toothed ring that rotates with the first tooth ring and that drives the output gear, the coil spring being mounted coaxial with the output gear and having a first end attached to the output gear and a second end attached to the clutch mechanism, the coil spring storing a kinetic energy from the starter motor by coiling and releasing the kinetic energy to the crankshaft via the clutch once the stored kinetic energy reaches a predetermined level; and
    an ultracapacitor module mounted on the engine, the ultracapacitor module configured to power the starter motor to start the engine, the ultracapacitor module including at least one single ultracapacitor having a second axis extending in a longitudinal direction thereof, and the first axis configured to be not parallel to the second axis.

2. The internal combustion engine according to the claim 1, wherein the ultracapacitor module is further configured to power at least one of the fuel supply system and the ignition system.

3. The internal combustion engine according to the claim 1, further including:
    a control system including at least one sensor and a control unit; and
    at least one sensor receiving the operating condition signals of the engine and communicating the received operating condition signals to the control unit, the control unit controlling at least one of the ignition system and the fuel supply system according to the received operating condition signals.

4. The internal combustion engine according to the claim 3, further including:
    an operation unit issuing user command signals to the engine when the user operates the trigger, the control unit controlling at least one action of start, stop and fuel supply adjustment of the engine according to the received user command signals.

5. The internal combustion engine according to claim 1, wherein the clutch mechanism includes a sprag clutch.

6. The internal combustion engine according to claim 1, further including a receiver provided on the engine, the ultracapacitor module being removably attached to the receiver.

7. A garden tool comprising:
    a torque unit including a small type internal combustion engine and a working unit driven by the torque unit, the engine including:
    an engine block including a cylinder;
    a piston positioned within the cylinder, the piston reciprocating in the cylinder along a first axis;
    a crankshaft configured to be driven by the piston;
    a fuel supply system for supplying an air-fuel mixture to the cylinder;
    an ignition system;
    an electric starting system including a starter motor having an output shaft, an input gear being mounted for rotation with the output shaft;
    a clutch mechanism mounted to the crankshaft;
    a reduction mechanism driven by the input gear, the reduction mechanism having a transmission gear, an output gear, and a coil spring, the transmission gear having a first toothed ring driven by the input gear and a second toothed ring that rotates with the first tooth ring and that drives the output gear, the coil spring being mounted coaxial with the output gear and having a first end attached to the output gear and a second end attached to the clutch mechanism, the coil spring storing a kinetic energy from the starter motor by coiling and releasing the kinetic energy to the crankshaft via the clutch once the stored kinetic energy reaches a predetermined level; and
    an ultracapacitor module mounted on the engine, the ultracapacitor module configured to power the starter motor to start the engine, the ultracapacitor module including at least one single ultracapacitor having a second axis extending in a longitudinal direction thereof, and the first axis configured to be not parallel to the second axis.

8. The garden tool according to claim 7, further including:
    an operation unit, located on a handle unit, the operation unit issuing user command signals to the engine when the user operates the trigger; and
    a control unit, located on the engine, the control unit controlling at least one action of start, stop and fuel supply adjustment of the engine according to the received user command signals.

9. The garden tool according to claim 8, wherein the operation unit is configured to be a panel, at least two keys are located on the panel, and a protrusion portion is located between the two keys.

* * * * *